July 15, 1969   MASAKI ISSHIKI   3,455,225
FINDER OPTICAL SYSTEM OF A SINGLE LENS REFLEX CAMERA
Filed Oct. 27, 1966

United States Patent Office 3,455,225
Patented July 15, 1969

3,455,225
FINDER OPTICAL SYSTEM OF A SINGLE LENS REFLEX CAMERA
Masaki Isshiki, Tokyo, Japan, assignor to Nippon Kogaku K.K., Tokyo, Japan, a corporation of Japan
Filed Oct. 27, 1966, Ser. No. 590,053
Int. Cl. G03b 19/12
U.S. Cl. 95—42                                    2 Claims

ABSTRACT OF THE DISCLOSURE

A view finder optical system for a reflex camera having a penta prism through which the image of the exposure meter indicator pointer may be read. The exposure meter reading is reflected into the penta prism through the surface of the prism facing the view finder eyepiece. This image is then reflected through the penta prism and back into the eyepiece so that both the scene and the exposure meter indicator may be read through the viewfinder eyepiece.

---

The present invention relates to a new optical system of a single lens reflex camera having a penta roof edge prism within the finder into which an image of the indicating pointer of the electric exposure meter and other various kinds of exposure values are introduced by making use of reflecting surfaces of the penta roof edge prism.

As the conventional methods for leading the indicating pointer of the exposure meter or exposure values into the finder of a single lens reflex camera, the following systems are known, i.e. (1) the system according to which the indicating pointer of the exposure meter is placed right below the penta roof edge prism close to the focussing plate; (2) the system according to which the silver plating of the roof type reflecting surface of the penta roof edge prism is partially peeled off and a small prism is adhered thereon, and through the thus provided window the indicating pointer of the exposure meter is led in; (3) the silver plating on the front reflecting surface of the penta roof edge prism is partially peeled off, and from the thus prepared window, the indicating pointer of the exposure meter can be observed. However, in accordance with the system of (1), the observation of the object is troublesome in case the exposure values or the like are led into the finder view, and in case it is placed out of the finder view, it is necessary to make the prism itself larger. In accordance with the system of (2), which is comparatively safe, it is necessary to adhere a small prism on the roof edge surface and the processing of prism becomes very complicated, and in accordance with the system of (3) observation is carried out through the window provided by peeled off part of the silver plating through the penta roof edge prism, and therefore considerable restriction is necessitated at the position of the pupil because the observation of the indicating pointer of the exposure meter is prevented by the window frame through the displacement of the pupil.

The object of the present invention is to provide a new optical system according to which the above mentioned drawbacks are overcome.

In accordance with the present invention, there is provided that a finder optical system for single lens reflex cameras including a finder screen, a condenser lens, a penta roof edge prism, an eyepiece, and an optical means for transmitting the image of an exposure indicating means such as the pointer of an exposure meter, or the figures or indicia showing f number or shutter speed or the like within the visual field of the finder, and comprising means for projecting the images of said indicating pointer or the like through said optical means into the penta roof edge prism obliquely through its surface facing the eyepiece to carry out the total reflection on the surface adjacent to the finder screen of said prism, reflecting the images twice on the front reflecting surface and the roof edge reflecting surface to form the real images thereof in the light path within the prism, projecting said real images from said surface facing the eyepiece, and leading the thus projected images into the visual field outside of the finder view.

Above object and other objects and the advantages of the present invention will be more clearly understood from the following explanation referring to the embodiment shown in the drawing in which.

Figure 1:
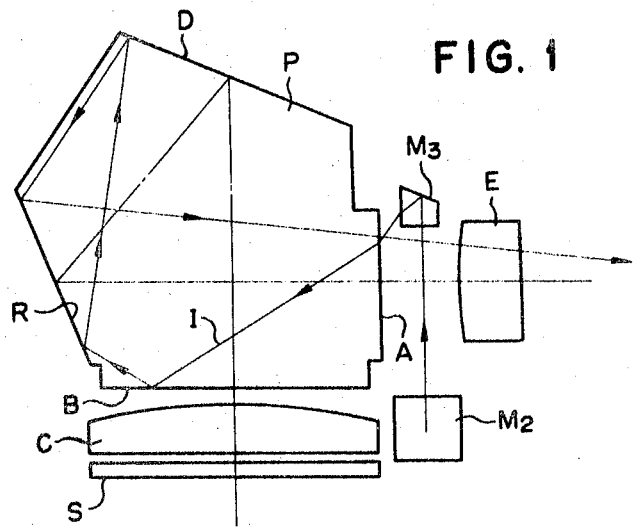
FIG. 1 is the side view of an embodiment of the present invention.

In FIG. 1, S is a screen of the finder, on which the image of an object to be photographed is formed, C is a condenser lens, P is a penta roof edge prism and E is an eyepiece, and this optical arrangement is the same as in the conventional optical system of single lens reflex cameras.

Figure 2:
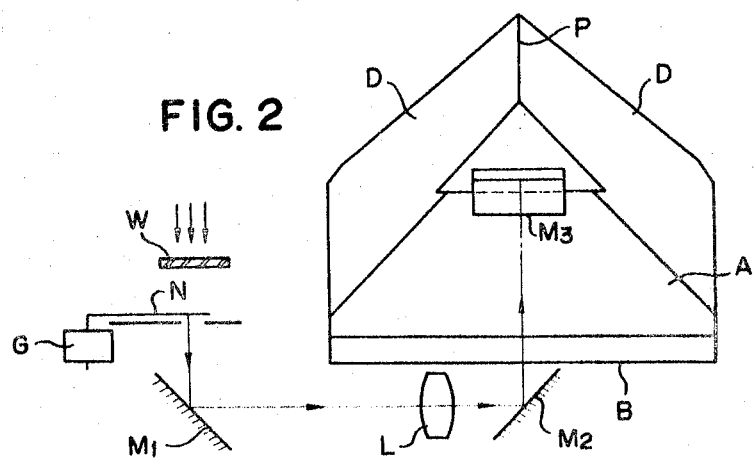
FIG. 2 is a diagram showing the portion of the indicating pointer of the exposure meter and the finder as viewed from the back thereof, and the diagram mainly shows the optical arrangement until the image of the indicating pointer is sent to the reflecting mirror.

Element $M_3$ is a small reflecting prism, and the image of the indicating pointer of the exposure meter is directed into the penta roof edge prism P from the second transmitting surface A of the prism facing the eyepiece E. In FIG. 2, G stands for a galvanometer, and N stands for the indicating pointer of the exposure meter, and it is illuminated by means of a window W on the upper portion of the camera housing and the image thereof is formed as is shown by I of FIG. 1 through reflecting mirrows $M_1$ and $M_2$, a positive lens L, and a reflecting prism $M_3$. The light rays which form the image on I, are totally reflected by the first transmitting surface B of the prism P on the side of the screen S and then reflected by the front reflecting surface R to be sent to the roof edge reflective surface D at the upper portion. The light rays which have come back from the roof edge surface D, are again reflected on the front reflecting surface R of the penta roof edge prism, and are sent to the eye through the eyepiece. The path of the above mentioned light rays is shown by the arrow in the figures.

Figure 3:
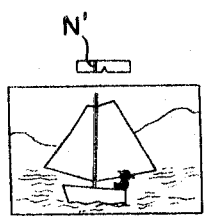
FIG. 3 is the diagram showing the state of observation of the visual field of the finder.

When the finder of the above mentioned structure is viewed through actually, the real image N' of the indicating pointer of the exposure meter can be observed on the image of the object as is shown in FIG. 3.

As mentioned above, the gist of the present invention resides in that by making use of the fact that the light rays coming from the second transmitting surface A facing the eyepiece to the penta roof edge prism P, are necessarily subjected to the total reflection on the transmitting surface B on the side of the screen, and that in cooperation with the functions of the other reflecting surfaces R and D, the in coming light rays are projected out from the transmitting surface A. Therefore, in accordance with the present invention it is possible to lead the indicating pointer of the exposure meter or the like into the visual field of the finder without providing any processings on the conventional penta roof edge prism, and therefore it is possible to observe the image of the indicating pointer of the exposure meter or the like simultaneously along with the image of the screen on the same plane, and therefore there is no trouble in the observation of the object, and the brightness of the images of the indicating pointer of the exposure meter or the like is not at all sacrificed, and at the same time even if the position of the pupil is more or less displaced, there is no fear that the indicating pointer of the exposure meter should be made unable to be observed.

What is claimed is:

1. A finder optical system in a single lens reflex camera comprising a focussing screen provided within the camera housing and on which the image of the scene to be photographed through the camera objective is formed; a penta roof edge prism located within the camera housing above said focussing screen, having a first light transmitting surface through which the light rays from said image of the scene enters said roof prism, first reflecting surfaces forming a roof edge, a second reflecting surface being adjacent to said first light transmitting surface, and a second light transmitting surface through which said light rays are reflected by said first and second reflecting surfaces within said roof prism and passes along the line of sight of the observer; an eye piece facing said second transmitting surface; and optical means for exposure condition indicating means having at least one reflecting surface located between said second transmitting surface and said eye piece and inclined toward said first and second transmitting surfaces, said optical means obliquely projecting the light rays of the image of the exposure condition indicating means into said penta roof edge prism through said second transmitting surface to carry out the total reflection on said first transmitting surface, and said first and second reflecting surfaces of said penta roof edge prism leading said image light rays along the line of sight of the observer toward said eye piece.

2. A finder optical system according to claim 1, in which said optical means includes a reflecting prism, at least a reflecting mirror and a positive lens; said reflecting prism located between said second transmitting surface and said eyepiece, the reflecting surface of which is inclined toward said first and second transmitting surfaces, said reflecting mirror leading said image light rays passing through said lens, across the line of sight of the observer toward said reflecting prism.

References Cited

UNITED STATES PATENTS

| | | | |
|---|---|---|---|
| 3,094,911 | 6/1963 | Reiche et al. | 95—42 X |
| 3,282,178 | 11/1966 | Nelson | 95—42 X |
| 3,314,345 | 5/1967 | Ebertz et al. | 95—42 X |
| 3,327,600 | 6/1967 | Trankner | 95—42 |

FOREIGN PATENTS

| | | |
|---|---|---|
| 1,208,620 | 1/1966 | Germany. |
| 1,218,874 | 6/1966 | Germany. |

NORTON ANSHER, Primary Examiner

CHARLES B. FUNK, Assistant Examiner